(12) United States Patent
Geckeler et al.

(10) Patent No.: US 11,630,740 B2
(45) Date of Patent: Apr. 18, 2023

(54) SECURITY BY DEFAULT IN A CLOUD ENVIRONMENT

(71) Applicant: SAP SE, Walldorf (DE)

(72) Inventors: Florian Geckeler, Berlin (DE); Henrik Hempelmann, Havelberg (DE); Martin Brunzema, Berlin (DE); Paul Beck, Berlin (DE); Anne Roessiger, Berlin (DE); Kathrin Mao, Berlin (DE)

(73) Assignee: SAP SE, Walldorf (DE)

( * ) Notice: Subject to any disclaimer, the term of this patent is extended or adjusted under 35 U.S.C. 154(b) by 186 days.

(21) Appl. No.: 17/340,679

(22) Filed: Jun. 7, 2021

(65) Prior Publication Data
US 2022/0391290 A1    Dec. 8, 2022

(51) Int. Cl.
*H04L 29/06*    (2006.01)
*G06F 11/14*    (2006.01)
*H04L 9/40*    (2022.01)

(52) U.S. Cl.
CPC ...... *G06F 11/1464* (2013.01); *G06F 11/1461* (2013.01); *H04L 63/08* (2013.01); *H04L 63/10* (2013.01); *H04L 63/20* (2013.01)

(58) Field of Classification Search
CPC ......... H04L 63/10; H04L 63/20; H04L 63/08; H04L 63/101; H04L 63/108; H04L 63/083

USPC .............................................................. 726/4
See application file for complete search history.

(56) References Cited

U.S. PATENT DOCUMENTS

| | | | |
|---|---|---|---|
| 2019/0095289 A1* | 3/2019 | Kumar | G06F 11/1451 |
| 2020/0341862 A1* | 10/2020 | He | G06F 3/067 |
| 2021/0240579 A1* | 8/2021 | Khandkar | G06F 16/27 |

* cited by examiner

*Primary Examiner* — Longbit Chai
(74) *Attorney, Agent, or Firm* — Buckley, Maschoff & Talwalkar LLC

(57) ABSTRACT

A system and method to create a plurality of hyperscaler accounts having predefined access rights to an object store of a database service in a cloud environment; store hyperscaler credentials specifying access rights to the object store corresponding to the predefined access rights of the hyperscaler accounts in a secure credential store, the hyperscaler credentials providing access to the object store for a specified backup function; map each of a plurality of different backup service component processes to one of the hyperscaler credentials, each of the plurality of backup service component processes operative independent of each other and having a specific backup service functionality; receive a request to execute one of the plurality of different backup service component processes; and authenticate access rights of the backup service component process included in the request based on the mapping.

18 Claims, 9 Drawing Sheets

220

| | | |
|---|---|---|
| 235 ▶ | BACKUP-DATA-JOB & OBJECT-STORE SERVICE | ACCESS TO CREDENTIALS OF HYPERSCALER ACCT 1 | ◀ 250 |
| 240 ▶ | BACKUP-LIFECYCLE-JOB | ACCESS TO CREDENTIALS OF HYPERSCALER ACCT 3 | ◀ 255 |
| 245 ▶ | BACKUP-DEPROVISION-JOB | ACCESS TO CREDENTIALS OF HYPERSCALER ACCT 2 | ◀ 260 |

200

| HYPERSCALER ACCOUNT 1 | READ/WRITE ONLY TO/FROM STORAGE |
|---|---|
| HYPERSCALER ACCOUNT 2 | LIST/DELETE ONLY TO/FROM STORAGE |
| HYPERSCALER ACCOUNT 3 | DELETE FROM STORAGE |

205 → row 1, 210 → row 2, 215 → row 3

| BACKUP-DATA-JOB & OBJECT-STORE SERVICE | ACCESS TO CREDENTIALS OF HYPERSCALER ACCT 1 |
|---|---|
| BACKUP-LIFECYCLE-JOB | ACCESS TO CREDENTIALS OF HYPERSCALER ACCT 3 |
| BACKUP-DEPROVISION-JOB | ACCESS TO CREDENTIALS OF HYPERSCALER ACCT 2 |

235 → row 1, 240 → row 2, 245 → row 3; 250 → row 1, 255 → row 2, 260 → row 3

*FIG. 2B*

SECURITY BY DEFAULT IN A CLOUD ENVIRONMENT

BACKGROUND

A number of large cloud infrastructure and service providers provide the infrastructure to support customers in need of robust, reliable, and scalable storage and compute needs. These large cloud infrastructure and service providers, also referred to as hyperscalers, may provide the hosting infrastructure for different types of services, including for example, a Database as a Service ("DBaaS"). An important aspect of providing a database service is providing backup and recovery processes to protect the database service against data losses and to reconstruct the database in the event of, for example, a data loss or other data inconsistency, to a known prior state. In some aspects, a cloud backup service may provide a number of advantages and benefits, including, for example, assured access to the data, automated backup and management thereof, secure and affordable backups, as well as quick data restorations. For maintenance reasons, the database service (or methods thereof) provides access to a storage device that stores backups for the database service in order to facilitate the functions of reading, writing, and deleting backups (e.g., certain backups might no longer be required for recovery when there is an expiration policy that defines a certain maximum age for backups).

However, data security is a significant concern regarding database backups stored in the cloud. In some aspects, controlled management of access rights and permissions of cloud storage devices and systems for database backups stored in the cloud may be an important feature for offering services in the cloud.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2A is an illustrative table listing of hyperscaler accounts, in accordance with an example embodiment;

FIG. 2B is an illustrative depiction of a mapping for hyperscaler accounts, in accordance with an example embodiment;

Figure 1:
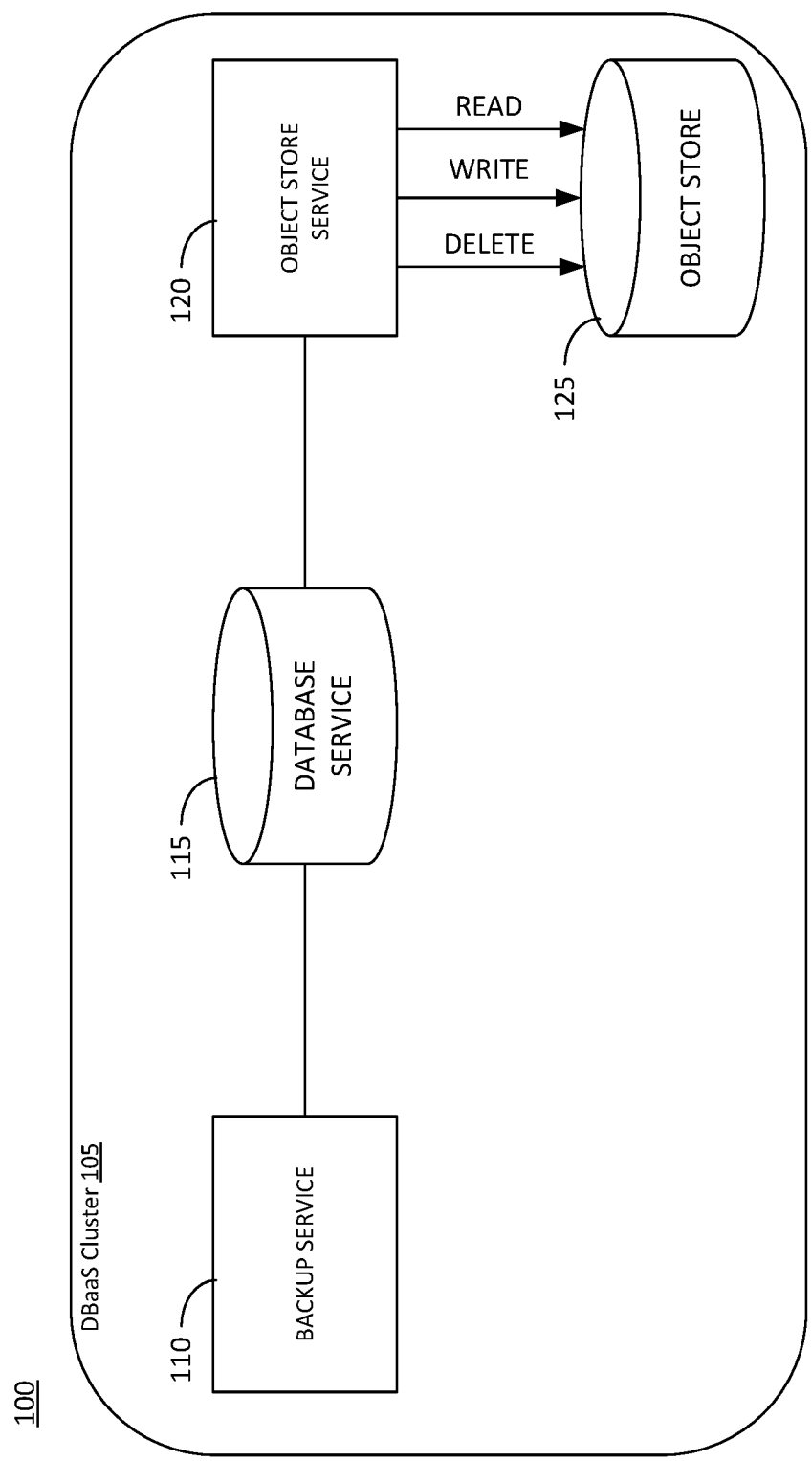
FIG. 1 is an illustrative block diagram of a typical system associated with a Database as a Service ("DBaaS") in a hyperscaler environment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the one or more principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures, methods, procedures, components, and circuits are not shown or described so as not to obscure the description with unnecessary detail. Thus, the present disclosure is not intended to be limited to the embodiments shown but is to be accorded the widest scope consistent with the principles and features disclosed herein.

As used herein, the term "hyperscaler" refers to a company or other entity that provides, for example, public cloud and cloud service industries, although other services and businesses might also be provided. Hyperscalers may provide, maintain, and upgrade the infrastructure, including hardware, (customized) software, facilities, power management systems, etc. to provide services to customers with improved uptime. A hyperscaler includes all of the hardware, software, networks, facilities, energy management systems, and other operational aspects, whether custom or commodity acquisitions, to enable and support large cloud infrastructure and services for large numbers of users (e.g., millions of customers of hosted services).

In some aspects, a database service provider may provide cloud infrastructure and database services to customer users thereof. A backup service may be offered by the database service provider to determine and manage the selection and administration of backup and recovery processes for the database services provided by the database service provider. The backup service can be further configured to issue commands or requests to the database service to execute a backup strategy determined by the backup service, wherein the database service may proceed to create the specified backup type and store or delete the backup in the database service's storage device or system.

In some aspects, a backup service might be offered by the database service provider to provide and manage data backups in the cloud environment. In some aspects, a database service provider in some embodiments herein may provide a backup service that might create a database backup, delete old database backups, and read database backups to manage the recovery of a database in the event of, for example, a disaster that eliminates, corrupts, or otherwise introduces an inconsistency in the data of the database.

FIG. 1 is a block diagram of a typical system 100 associated with a DBaaS. In particular, system 100 includes a DBaaS cluster 105 including a backup service 110. Backup service 110 might be a central backup service that provides and otherwise handles the administration of processes, jobs, and methods related to database backup and recovery processes for database service nodes (also referred to as a "database service" herein) in cluster 105. In the example of FIG. 1, backup service 110 might be provided by a database service provider to communicate with the database service 115 (e.g., via an Application Programming Interface, API) to manage all aspects of data backups. Backup service 110 may manage hundreds of thousands of database service nodes deployed in cluster 105. As such, while only one (1) database service node 115 is depicted in FIG. 1 (and other figures herein) for purposes of illustrative clarity, embodiments might typically include many database service nodes. Backup service 110 may interact with database service 115 to perform routine database backup operations (e.g., on an hourly basis, on a daily basis, after a predetermined number of database transactions have been executed, in response to a data recovery event such as a data destruction or data inconsistency, etc.). Backups of the database data maybe backed up to an object store 125 that stores data as "objects". Object store 125 may store backups of the database service's data. In some embodiments, the backups may include data backups and log backups corresponding to database data persisted at persistent storage for the database (not shown in FIG. 1).

Backup service 110 may trigger a request for database backup functions (e.g., read a backup, write a backup, delete a backup, etc.) by initiating a backup data job or process that triggers database service 115 to request the database backup functions. Database service 115, in response to the trigger from backup service 110, may request the database backup functions via object store service 120. Object store service 120 connects database service 115 to object store 125 associated with database service 115 and may be provided by the cloud infrastructure and service (i.e., hyperscaler) provider supporting system 100.

In some aspects, object store service 120 acts as a gateway that receives data from database service 115 and writes the data to object store 125 via writes actions, reads data from object store 125 in the case of a recovery action, and deletes backups in response to requests from database service 115 triggered by backup service 110. In order to facilitate the execution of the read, write, and delete requests at the hyperscaler object store, backup service 110 uses one (1) universal technical account (e.g., a method, etc.) that has full (i.e., all) access privileges required to read, write and delete objects (e.g., backups) in the hyperscaler's object store. In some embodiments, this universal account can spin up new compute units. In some aspects, since the database service is offered to customers, the data that is sent into the database cluster is not controlled or verified.

There are however disadvantages to the approach of FIG. 1. For example, if a cyber-attacker is able to execute malicious code to obtain the universal technical account that includes all of the privileges needed to read, write and delete database backups in the hyperscaler's object store, then they may be able to read backups from the object store (although such database backups might be encrypted and not readily, or even possibly, decrypted), overwrite existing backups to corrupt the object store, delete backups that may be required to perform a database recovery, and/or spin up new compute unit instances to perform cost-intensive tasks (e.g., crypto-mining).

It may therefore be desirable to manage a database system backup service in a secure, automatic, and accurate manner (i.e., by default) without having a universal technical account that has global access rights used to read/write/delete database backups from/to a database backup storage.

In some embodiments, operations or functions managed by a backup service in a cloud environment may be created to operate independent of each other, where each component backup service component process has specific access rights. In one aspect, the access rights associated with a particular backup service component process might be defined to include the particular one or more access rights used by the particular backup service component process to effectuate its designed functionality or capability. For example, a backup service component process designed to perform a database backup and recovery of a database may be associated with READ and WRITE access, as these are used to carry out these functions. Similarly, a backup service component process configured to invoke a lifecycle management process to DELETE database backups older than a specified age (e.g., 14 days) might be associated with access rights to delete database backups. A backup service component process designed to perform a deprovisioning process that deletes all of the backups associated with a database service instance after the database service instance has been terminated by an owner of the database service instance (e.g., a customer terminates their database service account) may have delete access that is constrained to the deletion of the specific database backups related to the deleted database service instance. Accordingly, the different backup service component processes compatible with some embodiments each have their own access rights that correspond to the particular, specific function of each backup service component process. This is in contrast to the one (1) universal technical account discussed with regard to FIG. 1 that has global (i.e., all) access rights needed to perform any and all of the database backup functions (e.g., read, write, delete, compute unit spin up, etc.).

In some embodiments, dedicated accounts are created at a hyperscaler. Embodiments might include an account dedicated to READ/WRITE from/to an object store of the hyperscaler. Another dedicated account might be configured to LIST/DELETE backups to/from the hyperscaler object store. Yet another dedicated account might be created to DELETE database backups from the hyperscaler's object store. In some regards, each of these dedicated hyperscaler accounts might limit the methods allowed on the hyperscaler due to the specific access rights associated with each account. In these embodiments, the different hyperscaler accounts may each be limited in scope as defined by the specific access rights associated with each particular dedicated account.

In contrast to the single, backup service associated with the different backup operations discussed with respect to FIG. 1, some embodiments herein include multiple different backup service component processes, where each component process or job is capable of having access to one hyperscaler account that is used to perform a specific, database backup action, where each of the hyperscaler accounts have specified associated access rights.

In some aspects, the dedicated hyperscaler accounts disclosed herein may be, from a deployment perspective, small, relatively lightweight, and capable of being efficiently updated. As such, the present disclosure provides technical improvements, including improved security.

Regarding a backup service component process to read and write database backups to a hyperscaler object store, such a component process or service might use an access to data in an object store to create database backups and use an access to read database backups from the object store to perform a database recovery.

For a deprovisioning backup service component process, there might not be an operation to simply "delete all" database backups related to a terminated database service. Instead, the hyperscaler may first be queried to determine what data is available on the object store (i.e., using a "LIST" operation). Then, a DELETE command can be sent to the hyperscaler object store for each of the listed objects, where all of the specific objects included in a reply to the LIST query can be specified for deletion in a DELETE command. Note that the database service for which the deprovisioning is performed is already non-existent when a deprovisioning operation is requested. As such, the deprovisioning backup service component process first ascertains what data is available and then deletes the data listed in the reply.

In some embodiments regarding a lifecycle management backup service component process to delete expired database backups, the database services related to the expired database backups should be available to report what data is available. As such, the database backups available on the hyperscaler storage can be determined and only a DELETE process can be executed to delete the expired database backups.

As an example, consider a database service provided in a hyperscaler environment where three (3) different hyperscaler accounts, each with specific, dedicated access rights at a hyperscaler are created to provide and support multiple different database backup service component processes or functions, in accordance with some embodiments herein. The multiple, different database backup service component processes may include, for example, a backup service component to read/write data to a hyperscaler storage, a lifecycle management service component to delete expired backups, and a deprovisioning service component to list/delete backups associated with terminated database services. The multiple different backup service component processes may each be operative to execute a specific backup service functionality, independent of the other backup service component processes. Three different database backup service component processes are included in a present example, although fewer, more, or alternative substitute database backup service component processes may be included in some embodiments.

Per this example, the three different hyperscaler accounts may be delineated as follows and as illustrated in FIG. 2A, table 200. Hyperscaler account 1 (205) is an account to Read/Write only to/from storage of the hyperscaler, hyperscaler account 2 (210) is an account to LIST/Delete only to/from the hyperscaler storage, and hyperscaler account 3 (215) is an account to Delete only from the hyperscaler storage. In some aspects, specific, custom access rights are defined herein to ensure fine granularity of access rights and a high level of security. Each of the dedicated hyperscaler accounts may be associated with access credentials that are stored in a central credential store that is separate and distinct from the hyperscaler's object store.

In some aspects, a mapping can be established between the hyperscaler accounts and the multiple different backup service component processes (e.g., three dedicated processes in the above example). An example depiction of a mapping in accordance with some embodiments herein is illustrated in FIG. 2B, table 220. As presented in FIG. 2B, table 220 shows each of the three dedicated backup service component processes in the present example being mapped or associated with just one of the hyperscaler accounts depicted at 230. As such, each of the three dedicated backup service component processes 235, 240, and 245 is mapped to one of the credentials 250, 255, and 260 specifying access rights corresponding to one of the hyperscaler accounts that matches the specific backup service functionality of each respective backup service component process. For example, the backup service component process 235 to create and read backups is mapped to have access to credentials of hyperscaler account 1 at 250 that permits READ/WRITE to/from storage; the backup service component process 240 to delete expired backups is mapped to credentials 255 that permit access to hyperscaler account 3 to DELETE backups from the hyperscaler storage, and the backup service component process 245 to deprovision backups for terminated database services is mapped to permit access to credentials 260 of hyperscaler account 2 to LIST/DELETE backups from the hyperscaler storage.

Figure 3:
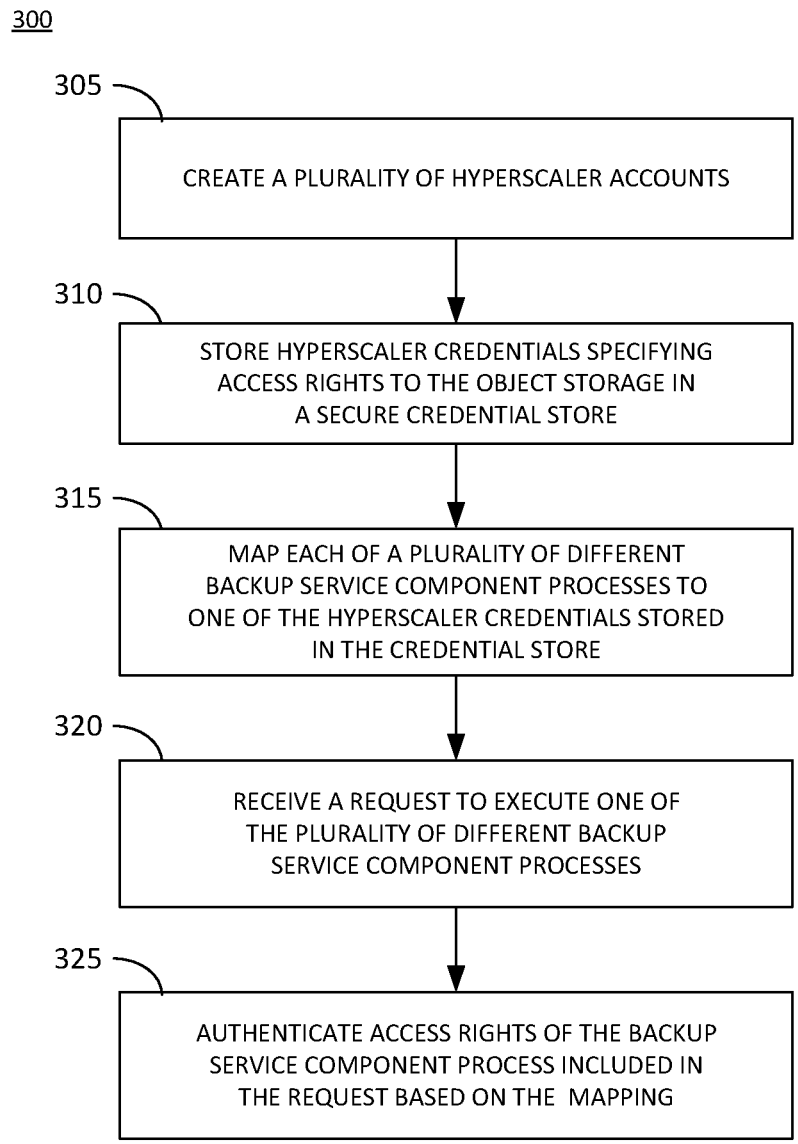
FIG. 3 is an illustrative flow diagram of a process for a DBaaS that supports secure data backup processes, in accordance with an example embodiment.

FIG. 3 is an illustrative flow diagram of a process 300 associated with a DBaaS that supports secure data backup processes, in accordance with an example embodiment. At operation 305, a plurality of hyperscaler accounts are created. In some embodiments, each of the hyperscaler accounts have predefined access rights to an object store of a database service in a cloud environment. In some instances, the access rights might include rights to, for example, WRITE data, READ data, DELETE data, LIST available data, etc.

At operation 310, hyperscaler credentials specifying access rights to the object storage of the hyperscaler corresponding to the created hyperscaler accounts may be stored in a secure credential store. In some embodiments, the credential store may be a "central" credential storage device, system, or service that may be provided for the storage of credentials for a plurality of hyperscaler accounts (e.g., across a cluster). The credential store may be separate and distinct from the object store of the database service and each of the stored hyperscaler credentials may provide access to the object storage for a specified backup function (e.g., READ/WRITE, DELETE, etc.). In some embodiments, the credentials may be stored in the credential store in response to an initialization of the database service.

Continuing to operation 315, process 300 operates to map each of a plurality of different backup service component processes to one of the credentials stored in the credential store. In some aspects, each of the plurality of backup service component processes operates independently of the other backup service component processes. Additionally, the backup service component processes might have a specific backup service functionality and the mapping associates the credential specifying access rights corresponding to the hyperscaler account matching the specific backup service functionality of the respective backup service component processes (See, FIG. 2B for an example mapping).

At operation 320, a request to execute one of the plurality of different backup service component processes may be received by a database service instance in reply to a trigger provided by a backup service managing database backup and recovery functions. As an example, the plurality of different backup service component processes may be selected from the group of processes, functions, methods, or services including a process to create a data backup, a process to lifecycle expired data backups, and a process to delete backups for a deprovisioned database instance.

In an effort to fulfill the request, access rights to the object storage for the backup service component process included in the request may be authenticated at operation 325 based on the hyperscaler credential mapping of operation 315 to verify and confirm the permissible access rights for the backup service component process included in the request. In response to the authentication, the backup service component process included in the request may be executed to access the object store to the extent specified by the credential mapped to the backup service component process and the particular functionality of the backup service component process (e.g., READ/WRITE, DELETE, LIST/DELETE, etc.) may be performed.

Figure 4:
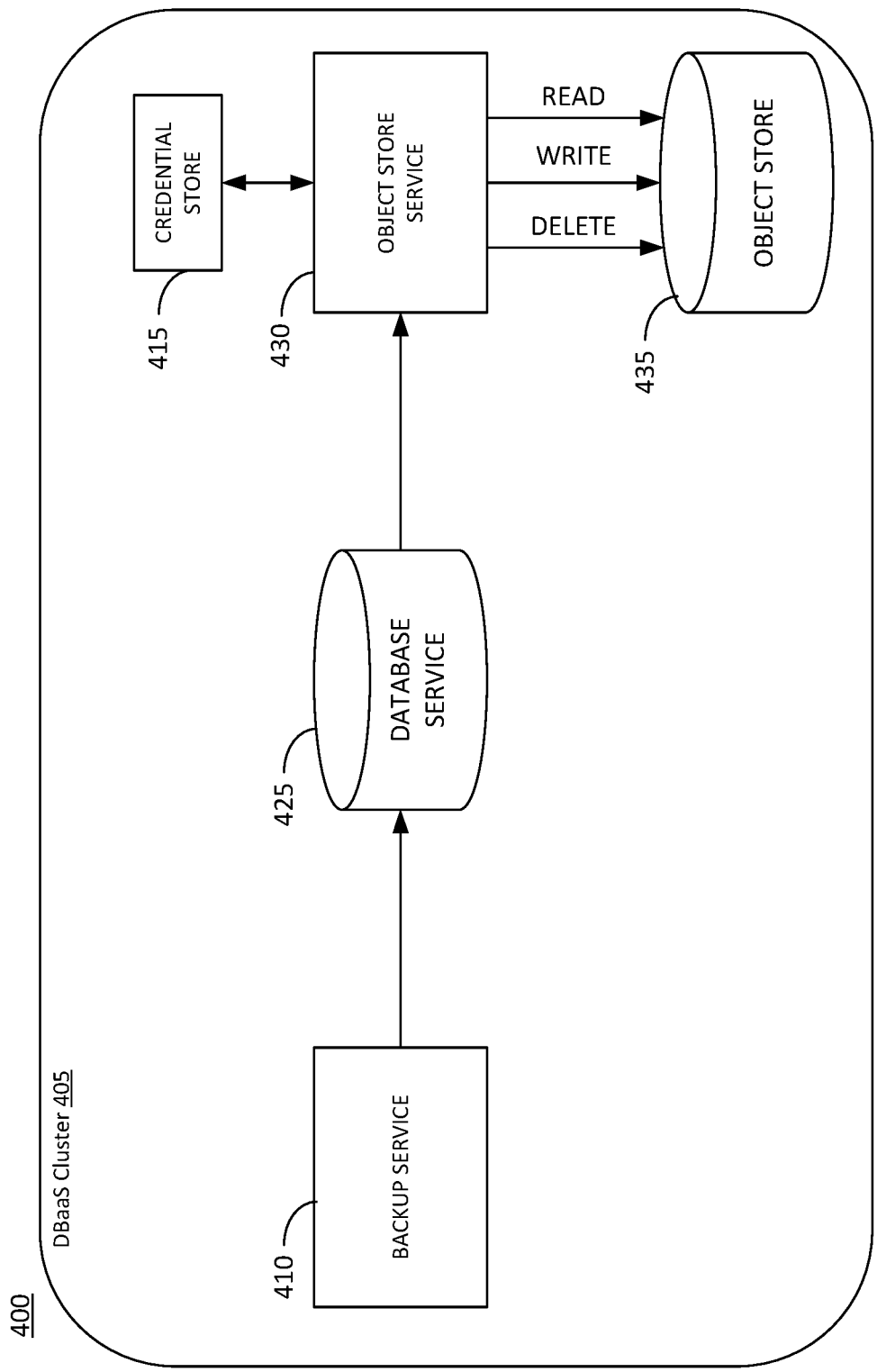
FIG. 4 is an illustrative block diagram of an architecture associated with a DBaaS that supports secure data backup processes, in accordance with an example embodiment.

FIG. 4 is an illustrative block diagram of an architecture 400 associated with a DBaaS that supports secure data backup processes, in accordance with an example embodiment. FIG. 4 is a block diagram of a system 400 associated with a DBaaS where, for example, system 400 includes a DBaaS cluster 405 including a backup service 410. Backup service 410 might be a central backup service that provides and otherwise handles the administration of processes, jobs, and methods related to database backup and recovery processes for database services or nodes in cluster 405. In the example of FIG. 4, backup service 410 might be provided by a database service provider to communicate with the database service 425 and object store 435 as required (e.g., via an API) to perform a plurality of different backup service component processes related to data backups. Backup service 410 may manage hundreds of thousands of database service nodes deployed in cluster 405, whereas database service 425 depicted in FIG. 4 is representative of the many database service nodes that might be included in cluster 405. Backups of the database data maybe backed up to the object store 435 that stores data as "objects". In some embodiments, the backups may include data backups and log backups corresponding to database data persisted at persistent storage for the database (not shown in FIG. 4).

In some instances, the plurality of different backup service component processes related to data backups might include, for example, processes, functions, services, or methods to create a data backup to READ/WRITE data to/from object store 435, a process to lifecycle expired data backups to DELETE data from object store 435, a process to delete backups for a deprovisioned database instance to LIST/DELETE data to/from object store 435, as well as other processes.

Backup service 410 may issue commands to invoke the plurality of different backup service component processes related to data backups, where each of the plurality of different backup service component processes might independently trigger requests directly to object store 435 in some instances and trigger requests to object store 435 via database service 425 and object store service 430 in other instances to perform other database backup operations (e.g., on an hourly basis, on a daily basis, after a predetermined number of database transactions have been executed, in response to a data recovery event such as a data destruction or data inconsistency, etc.). Object store service 430 connects database service 425 to object store 435 associated with database service 425 and may be provided by the cloud infrastructure and service (i.e., hyperscaler) provider supporting system 400.

Whether a particular backup service component process triggers a request directly to object store 435 or it triggers a request to object store 435 via database service 425 and object store service 430 in other instances might depend on the particular function(s) that are to be performed in association with the particular backup service component process. For example, a backup service component process that includes a READ/WRITE request might trigger a request to object store 435 via database service 425 and object store service 430 in some embodiments and a backup service component process that includes a LIST/DELETE request or a DELETE request might trigger a request directly to object store 435.

In some aspects, in order to facilitate the execution of the READ, WRITE, DELETE, LIST, etc. requests at the hyperscaler object store, dedicated accounts, each with specific, dedicated access rights at the hyperscaler object store 435, are created as disclosed with respect to process 300, operation 305. In some embodiments, process 300 may be implemented by a system or parts thereof embodied by the architecture of FIG. 4. Accordingly, credential store 415 is provided to securely store hyperscaler credentials specifying access rights to object store 435 of the hyperscaler corresponding to the created hyperscaler accounts. In some embodiments, credential store 415 may be configured with one or more security features including, for example, an encryption of data stored thereon. In some embodiments, credential store 415 may be separate and distinct from object store 435 of the database service and each of the stored hyperscaler credentials may provide access to object storage 435 for a specified backup function (e.g., READ/WRITE, DELETE, etc.). In some embodiments, the credentials may be stored in the credential store in response to an initialization of the database service.

Figure 5:
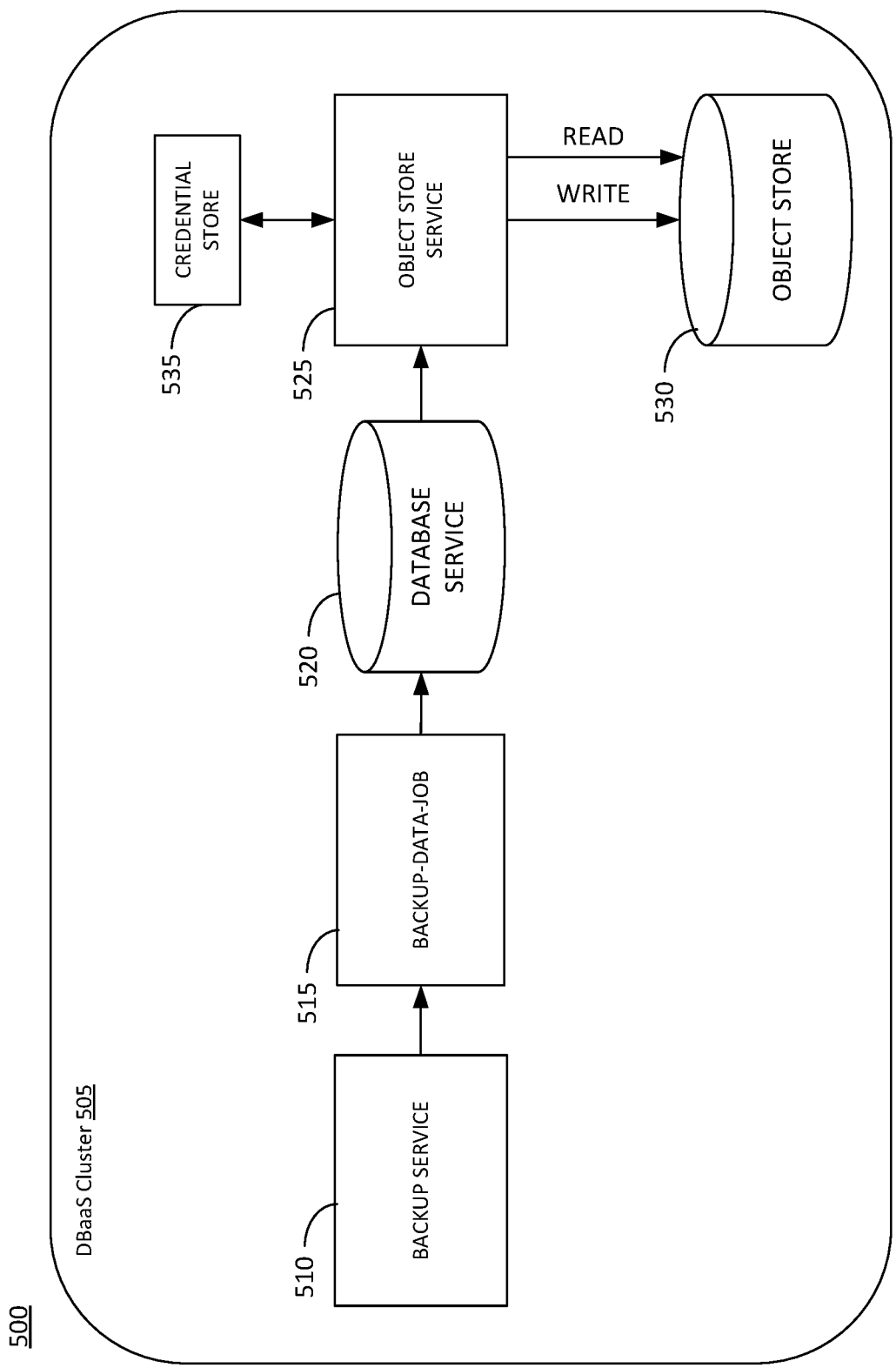
FIG. 5 is an illustrative block diagram of an architecture associated with a DBaaS to read and write database backups, in accordance with an example embodiment.

FIG. 5 is an illustrative block diagram of an architecture associated with a DBaaS to read and write database backups, in accordance with an example embodiment. Block diagram 500 of FIG. 5 illustrates a backup service component process that includes READ/WRITE access rights that may be used to, for example, implement data backups and database recovery actions. Backup service 510 handles the administration of multiple different, independent backup service processes for database service instances deployed in cluster 505. Database service 520 is representative of the one or more database services comprising cluster 505. In the example of FIG. 5, backup service 510 triggers backup-data-job 515 (also referred to as a "process" herein) that triggers a database backup request by database service 520 to create and/or recover data backups. Database service 520 sends the database backup request to object store service 525 that triggers READ/WRITE requests. The READ/WRITE requests are authenticated against credentials stored in a credential store 535, where the stored credentials specify the access rights for a dedicated hyperscaler account for a specified backup function. Object store service 525 has access rights limited to READ/WRITE objects from/to the object store 530. In the example of FIG. 5, the object store service is used to write database backup data to object store 530 and read database backups from the object store for recovery operations. The specific backup data job 515 triggered to perform a database backup function in the FIG. 5 scenario may only read/write objects from/to object store 530 with dedicated accounts. In this scenario, if an entity were able to infiltrate the database service and gain access to the object store service, their actions would be limited to read and writing data to the object store (i.e., no deleting and/or other tasks).

Figure 6:
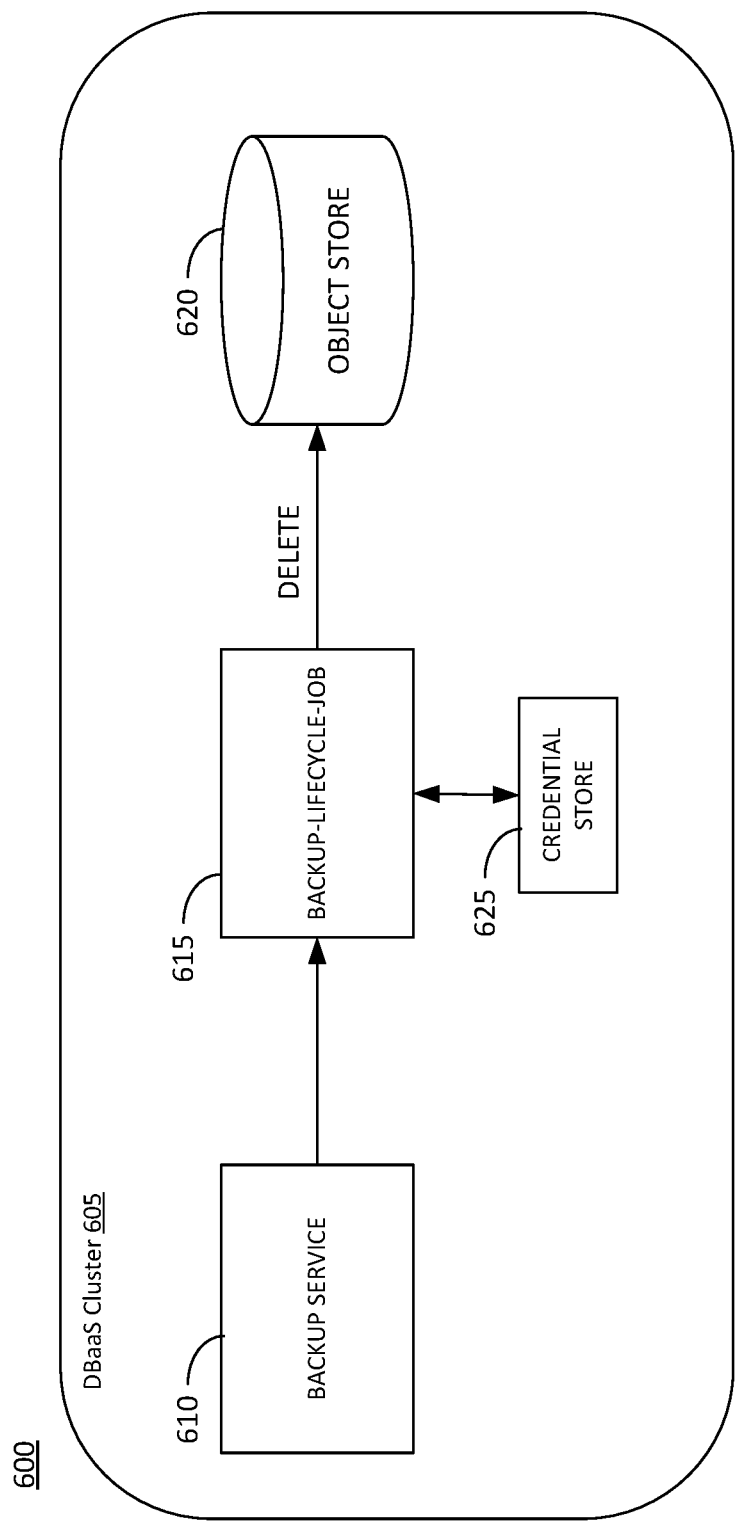
FIG. 6 is an illustrative block diagram of an architecture associated with a DBaaS to delete database backups, in accordance with an example embodiment.

FIG. 6 is an illustrative block diagram of an architecture associated with a DBaaS to delete database backups, in accordance with an example embodiment. Block diagram 600 illustrates a separate backup service component process that includes DELETE access rights that may be used to, for example, implement "housekeeping" of database backups to delete database backups that have aged a predetermined amount (e.g., according to a database backup expiration policy). Backup service 610 handles the administration of multiple different, independent backup service processes for database service instances deployed in cluster 605, where backup service 610 periodically triggers a backup lifecycle job 615 (e.g., once every hour, once every 12 hours, once a day, etc.) that deletes outdated backups from the hyperscaler's object store 620. In the example of FIG. 6, backup service 610 triggers backup lifecycle job 615 that triggers DELETE requests. The DELETE requests are authenticated against credentials stored in a credential store 625, where the stored credentials specify the access rights for a dedicated hyperscaler account for a specified backup function (e.g., backup lifecycle job 615). In response to an authentication of the DELETE requests, backup lifecycle job 615 triggers a database DELETE at object store 620. The access rights (i.e., credentials) associated with the backup lifecycle job may be limited to deleting database backups. In this context, if a bad actor were somehow able to gain control of the backup lifecycle job 615, they might be limited to being able to delete database backups.

In some aspects, backup lifecycle job 615 might only delete database backups. In some respects, a benefit of system 600 includes the aspect that the component (i.e., function, process, method, etc.) that deletes the backup is not the database service, which is very complex, but is a backup lifecycle job 615 with associated credentials pertinent to database backups that are designed for security. In the example of FIG. 6, the backup lifecycle job performs the requested, critical database backup operation, as opposed to a database service.

Figure 7:
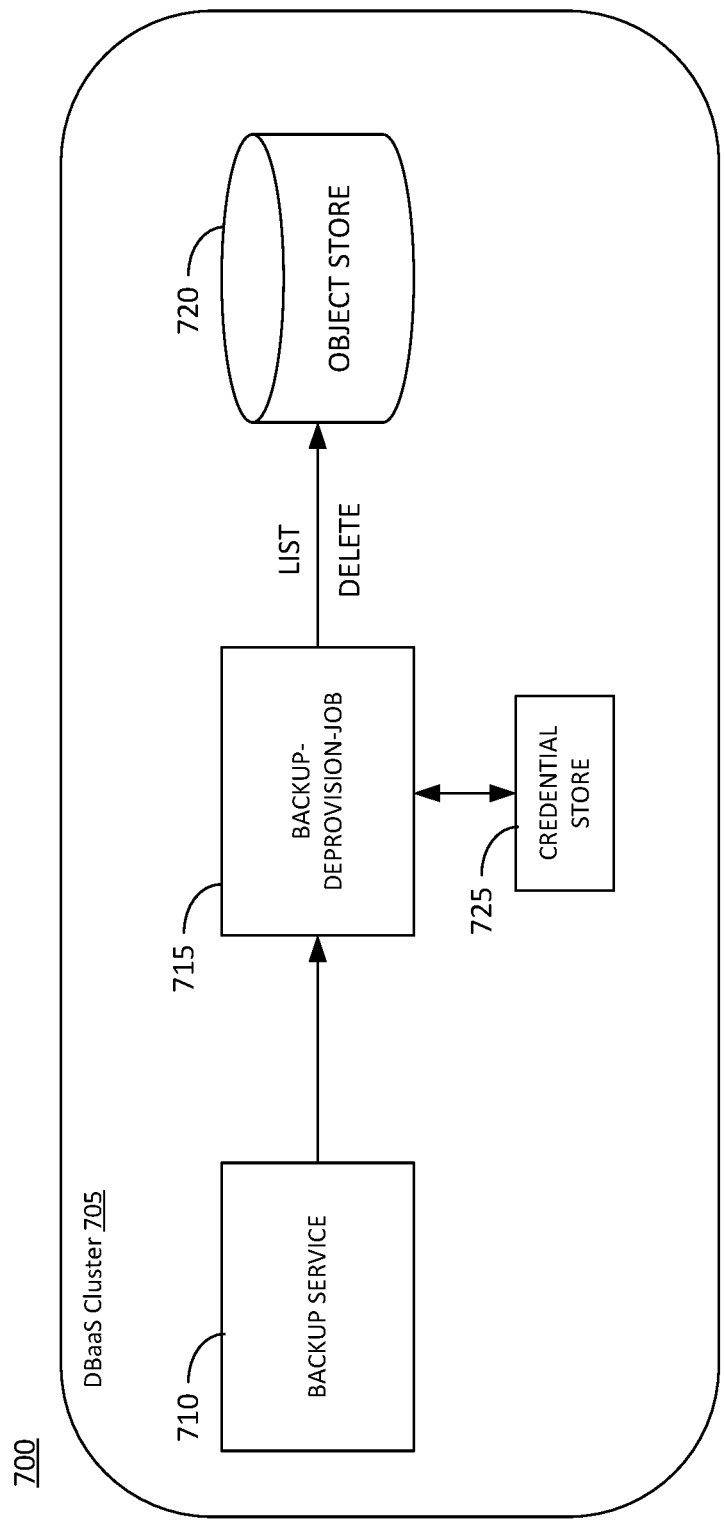
FIG. 7 is an illustrative block diagram of an architecture associated with a DBaaS to deprovision database backups, in accordance with an example embodiment.

FIG. 7 is an illustrative block diagram of an architecture associated with a DBaaS to deprovision database backups, in accordance with an example embodiment. Block diagram 700 illustrates a separate backup service component process that includes LIST/DELETE access rights that may be used to, for example, implement a deprovisioning process to delete all database backups associated with a terminated or otherwise decommissioned database service after a predetermined period of time (e.g., 14 days, etc.) in agreement with a defined retention policy. Backup service 710 handles the administration of multiple different, independent backup service processes for database service instances deployed in cluster 705, where backup service 710 schedules a backup deprovision job 715. In the example of FIG. 7, backup deprovision job 715 triggers LIST/DELETE requests. The LIST/DELETE requests are authenticated against credentials stored in a credential store 725, where the stored credentials specify the access rights for a dedicated hyperscaler account for a specified backup function (e.g., backup service 710). In response to an authentication of the LIST/DELETE requests, backup deprovision job 715 triggers database LIST/DELETE operations at object store 720. In the example of FIG. 7, the backup deprovision job is associated with DELETE and LIST access rights, where this particular backup service component process uses the LIST access to query the hyperscaler for the objects stored thereon so that the specific database backups listed or otherwise included in a reply by the hyperscaler and related to the terminated database service can be deleted as facilitated per the DELETE access rights.

In some aspects, the different backup service component processes discussed in the examples of FIGS. 4-7 are each robust processes having access policies limited to their express jobs. Access rights are bound directly to the different backup service components based on their type (e.g., a type of backup service component process to read and write database backups is bound to READ and WRITE access rights, a backup-lifecycle-job type is bound to DELETE access rights, and a deprovisioning process type of component is bound to LIST/DELETE access rights), wherein each of the different backup service components might be constrained to access the credentials to which they are bound. These configurations provide additional security so that, for example, if a bad actor were to somehow garner control of a database service instance, they might only access the database backups since they might not actually be able to read the accessed backups that might also be encrypted. A would-be attacker might be able to write new data to the hyperscaler storage, but due to, for example, versioning and other mechanisms, they might be prevented from overwriting files. Thus, in these and other scenarios, the illustrated dedicated processes with associated, specific access rights might operate to confer greater security by limiting the extent of potential harm, if any.

Figure 8:
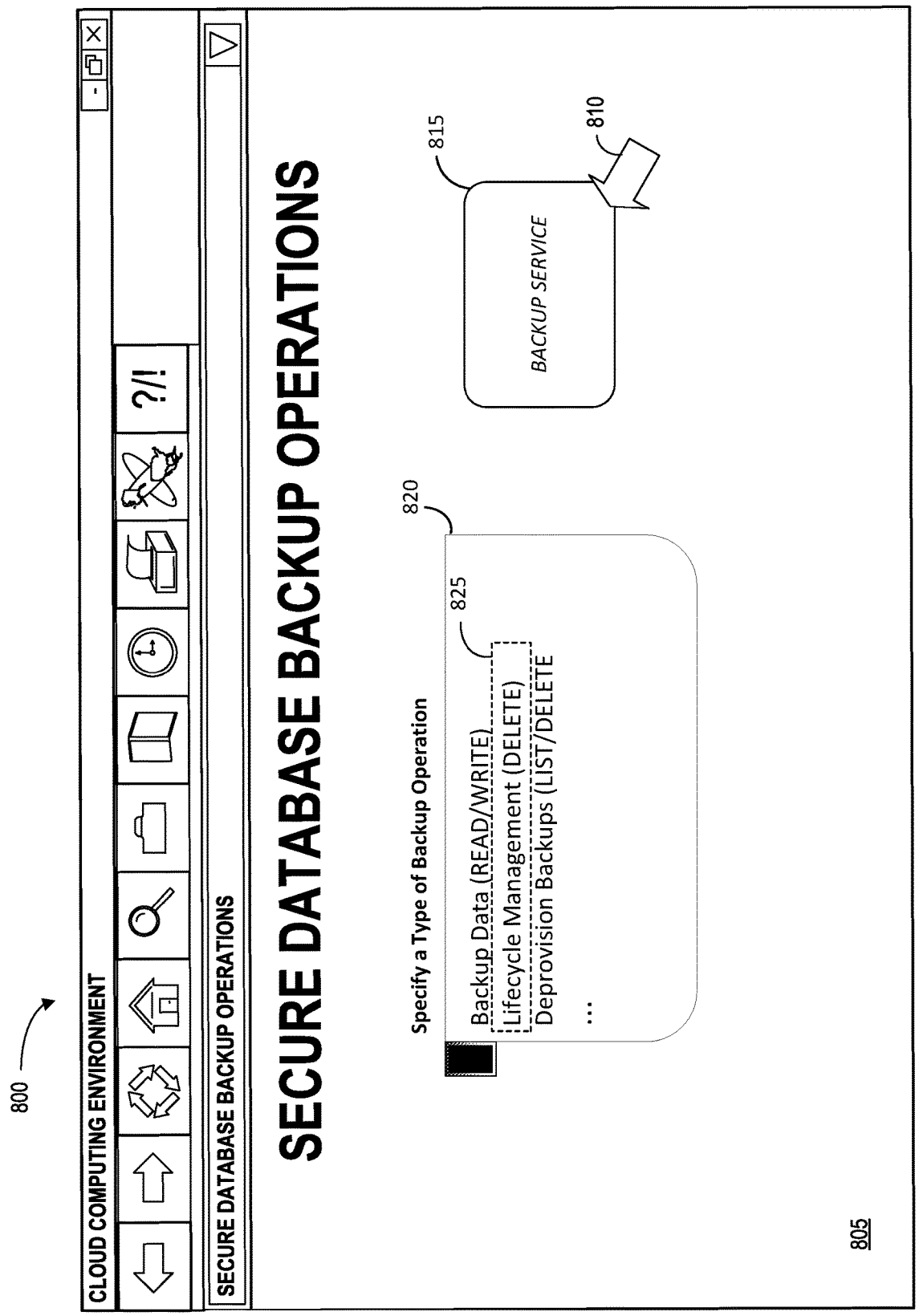
FIG. 8 is an outward facing user interface related to a system and process for a DBaaS in a cloud environment, in accordance with an example embodiment.

FIG. 8 is an outward facing user interface related to a system and process for a DBaaS in a cloud environment, in accordance with an example embodiment. Display 800 includes a graphical representation of an outward facing user interface (UI) 805 related to secure database backup operations in a cloud environment associated with a hyperscaler. UI 805 may be displayed within a display device associated with a database service or a display device independent of the database service (e.g., a display of a computing device or system in communication with an interface to the database service over a network via a browser application). Selection of one or more UI elements (e.g., icons, buttons, drop-down menu options, etc.) by a touchscreen input, computer pointer 810, etc. may result in the display of a popup window containing more detailed information about that element and/or various options. Selection of "Backup Service" UI button 815 may enable a database service provider administrator or other personnel to enter settings to select a type of backup plan or process to be implemented via a drop-down menu 820 that may facilitate selection and entry of a particular backup strategy for a secure database backup service or system herein. As shown, within drop-down menu 820, the "Lifecycle Management (DELETE)" option 825 is selected in the example of UI 805.

Figure 9:
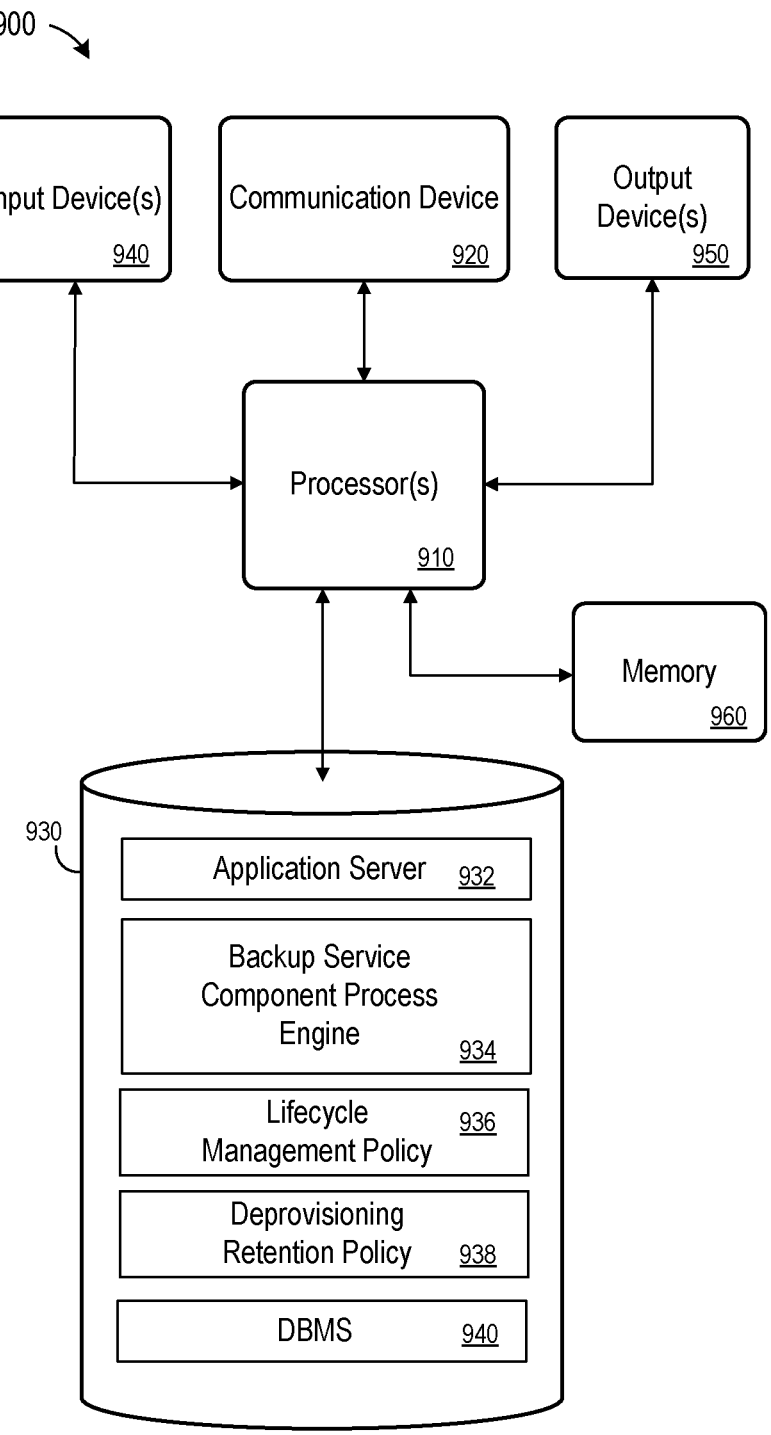
FIG. 9 is an illustrative block diagram of a computing system, in accordance with an example embodiment.

FIG. 9 illustrates a computing system 900 that may be used in any of the architectures or frameworks (e.g., FIGS. 4-7) and processes (e.g., FIG. 3, process 300) disclosed herein, in accordance with an example embodiment. FIG. 9 is a block diagram of server node 900 embodying a database backup service engine for a database service in a cloud environment, according to some embodiments. Server node 900 may comprise a general-purpose computing apparatus and may execute program code to perform any of the functions described herein. Server node 900 may comprise an implementation of at least some features of the architectures of FIGS. 4-7 in some embodiments. Server node 900 may include other unshown elements according to some embodiments.

Server node 900 includes processing unit(s) 910 operatively coupled to communication device 920, data storage device 930, one or more input devices 940, one or more output devices 950, and memory 960. Communication device 920 may facilitate communication with external devices, such as an external network or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Application server 932 may each comprise program code executed by processor(s) 910 to cause server 900 to perform any one or more of the processes described herein. Backup service component process engine 934 may execute one or more processes to implement a plurality of Backup service component processes for a particular database service in a cloud environment. Embodiments are not limited to execution of these processes by a single computing device. Data storage device 930 may also store data and other program code for providing additional functionality and/or which are necessary for operation of server 900, such as device drivers, operating system files, a lifecycle management policy 936, a database deprovisioning retention policy 938, etc. DBMS 940 may store and manage a variety of data types and structures.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system for providing backup process security in a cloud environment comprising:
   a memory storing processor-executable program code; and
   a processor device to execute the processor-executable program code in order to cause the system to:
      create a plurality of hyperscaler accounts, each hyperscaler account having predefined access rights to an object store of a database service;
      store hyperscaler credentials in a secure credential store specifying access rights to the object store of the database service corresponding to the predefined access rights of the hyperscaler accounts, the secure credential store being separate and distinct from the object store of the database service, each hyperscaler credential providing access to the object store of the database service for a specified backup function of a plurality of different backup service component processes;
      map each of the plurality of different backup service component processes to one of the credentials stored in the secure credential store, each of the plurality of backup service component processes, including at least a lifecycle expired data backup process, operative independent of each other and having a specific backup service functionality and the mapping associating the credential specifying access rights corresponding to one of the hyperscaler accounts matching the specific backup service functionality of one of the plurality of backup service component processes to invoke a specific backup function to carry out a respective database backup;
      receive a request to execute one of the plurality of different backup service component processes; and
      authenticate the access rights of the backup service component process included in the request to the object store of the database service based on the hyperscaler credential mapped to the backup service component process received in the request.

2. The system of claim 1, wherein the plurality of different backup service component processes include, at least, a process to create a data backup, a process to lifecycle expired data backups, and a process to delete backups for a deprovisioned database instance.

3. The system of claim 1, wherein the predefined access rights to the object store of the database service for the plurality of hyperscaler accounts include, at least, access rights to read/write only to/from the object store; access rights to list/delete only to/from the object store; and access rights to delete from the object store.

4. The system of claim 1, wherein each of the plurality of hyperscaler service accounts limits the backup service component processes allowed to execute on the object store to the specified backup function of the hyperscaler credential corresponding to the respective hyperscaler service account.

5. The system of claim 1, further comprising executing, in response to the authentication of the access rights of the backup service component process included in the request, the requested backup service component process.

6. The system of claim 1, wherein the storing of the credentials is performed in response to an initialization of the database service.

7. A computer-implemented method for providing backup process security in a cloud environment, the method comprising:
creating, by a database service from an encryption service of a database provider in a cloud environment, a plurality of hyperscaler accounts, each hyperscaler account having predefined access rights to an object store of a database service;
storing hyperscaler credentials in a secure credential store specifying access rights to the object store corresponding to the predefined access rights of the hyperscaler, the secure credential store being separate and distinct from the object store of the database service, each hyperscaler credential providing access to the object store of the database service for a specified backup function of a plurality of different backup service component processes;
mapping each of the plurality of different backup service component processes to one of the hyperscaler credentials stored in the secure credential store, each of the plurality of backup service component processes, including at least a lifecycle expired data backup process, operative independent of each other and having a specific backup service functionality and the mapping associating the hyperscaler credential specifying access rights to the object store matching the specific backup service functionality of one of the plurality of backup service component processes to invoke a specific backup function to carry out a respective database backup;
receiving a request to execute one of the plurality of different backup service component processes; and
authenticating the access rights of the backup service component process included in the request to the object store of the database service based on the hyperscaler credential mapped to the backup service component process received in the request.

8. The method of claim 7, wherein the plurality of different backup service component processes include, at least, a process to create a data backup, a process to lifecycle expired data backups, and a process to delete backups for a deprovisioned database instance.

9. The method of claim 7, wherein the predefined access rights to the object store of the database service for the plurality of hyperscaler accounts include, at least, access rights to read/write only to/from the object store; access rights to list/delete only to/from the object store; and access rights to delete from the object store.

10. The method of claim 7, wherein each of the plurality of hyperscaler service accounts limits the backup service component processes allowed to execute on the object store to the specified backup function of the hyperscaler credential corresponding to the respective hyperscaler service account.

11. The method of claim 7, further comprising executing, in response to the authentication of the access rights of the backup service component process included in the request, the requested backup service component process.

12. The method of claim 7, wherein the storing of the credentials is performed in response to an initialization of the database service.

13. A non-transitory, computer readable storage medium storing instructions for providing backup process security in a cloud environment, which when executed by at least one processor device cause a computer to perform a method comprising:
creating a plurality of hyperscaler accounts, each hyperscaler account having predefined access rights to an object store of a database service;
storing hyperscaler credentials in a secure credential store specifying access rights to the object store corresponding to the predefined access rights of the hyperscaler accounts, the secure credential store being separate and distinct from the object store of the database service, each hyperscaler credential providing access to the object store of the database service for a specified backup function of a plurality of different backup service component processes;
mapping each of the plurality of different backup service component processes to one of the hyperscaler credentials stored in the secure credential store, each of the plurality of backup service component processes, including at least a lifecycle expired data backup process, operative independent of each other and having a specific backup service functionality and the mapping associating the hyperscaler credential specifying access rights to the object store matching the specific backup service functionality of one of the plurality of backup service component processes to invoke a specific backup function to carry out a respective database backup;
receiving a request to execute one of the plurality of different backup service component processes; and
authenticating the access rights of the backup service component process included in the request to the object store of the database service based on the hyperscaler credential mapped to the backup service component process received in the request.

14. The medium of claim 13, wherein the plurality of different backup service component processes include, at least, a process to create a data backup, a process to lifecycle expired data backups, and a process to delete backups for a deprovisioned database instance.

15. The medium of claim 13, wherein the predefined access rights to the object store of the database service for the plurality of hyperscaler accounts include, at least, access rights to read/write only to/from the object store; access rights to list/delete only to/from the object store; and access rights to delete from the object store.

16. The medium of claim 13, wherein each of the plurality of hyperscaler service accounts limits the backup service component processes allowed to execute on the object store to the specified backup function of the hyperscaler credential corresponding to the respective hyperscaler service account.

17. The medium of claim 13, further comprising executing, in response to the authentication of the access rights of the backup service component process included in the request, the requested backup service component process.

18. The medium of claim 13, wherein the storing of the credentials is performed in response to an initialization of the database service.

* * * * *